Feb. 2, 1954  J. E. CHAPMAN  2,668,267
ELECTRIC MOTOR VALVE ACTUATOR SYSTEM
Filed Feb. 11, 1949
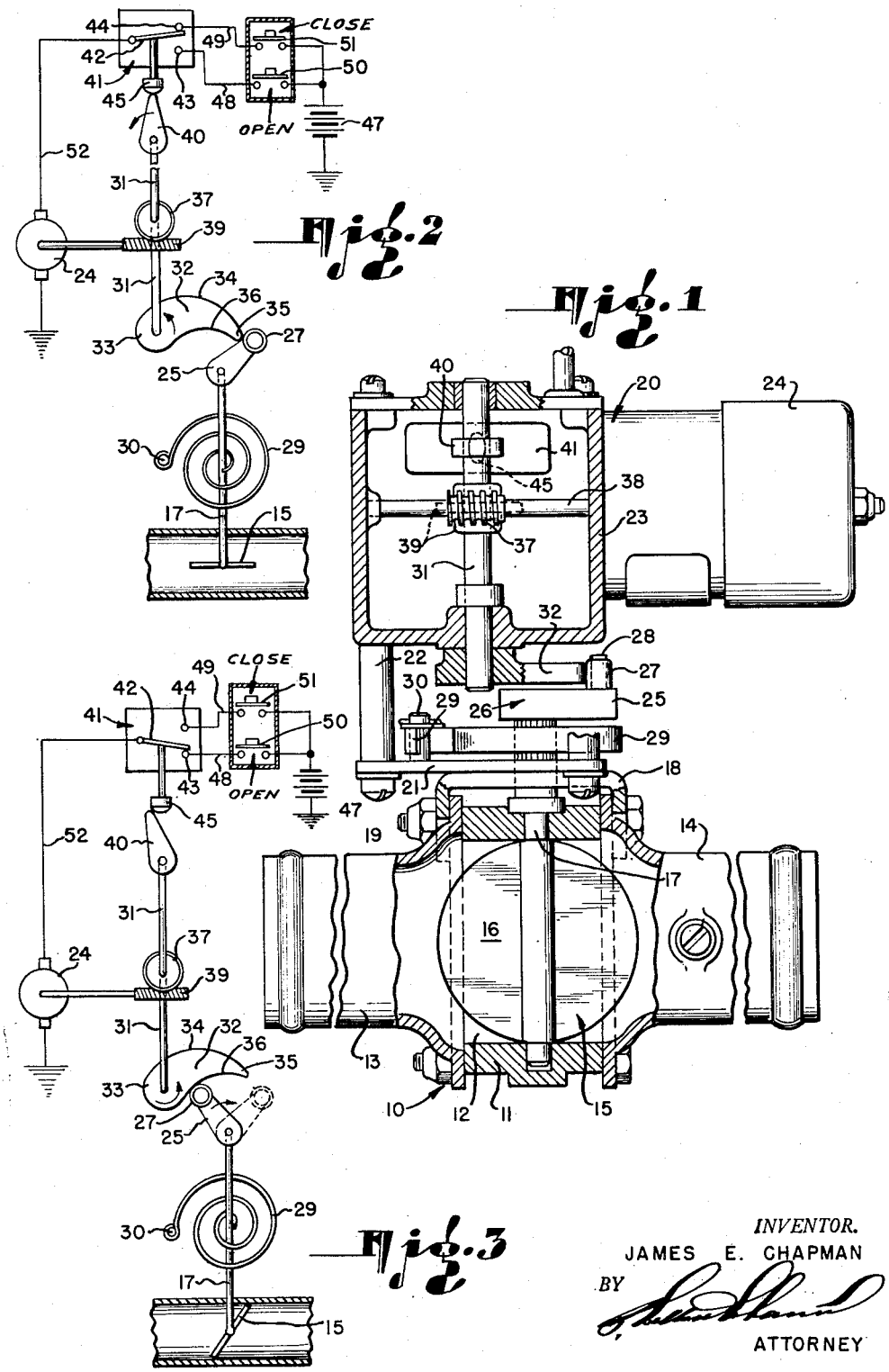
INVENTOR.
JAMES E. CHAPMAN
BY
ATTORNEY Patented Feb. 2, 1954

2,668,267

UNITED STATES PATENT OFFICE 2,668,267

ELECTRIC MOTOR VALVE ACTUATOR SYSTEM

James E. Chapman, Los Angeles, Calif., assignor to The Garrett Corporation, Los Angeles, Calif., a corporation of California Application February 11, 1949, Serial No. 75,889

5 Claims. (Cl. 318—466)

My invention relates to actuators having opening and closing valves and relates in particular to a simple and dependable actuator especially suitable for use in the valves of the butterfly type as a means for effecting opening and closing of such valves.

It is an object of the present invention to provide an actuator which will open and close a valve in response to actuation of separate control switches which may be placed at a distance from the valve, and it is a further object to provide in the actuator means to automatically stop movement of the closure of the valve when the closure is in prescribed opened and closed positions. In the preferred form of the invention, the operation of the mechanism automatically stops movement of the valve when it reaches fully opened or fully closed positions regardless of whether the corresponding control switches are kept closed after the aforesaid extreme positions of the valve are reached. Therefore, it is unnecessary for the operator to observe movement of the valve closure. All that it is necessary for him to do is to close the required switch, whereupon the actuator mechanism will respond to move the valve closure and to stop movement of the valve closure when it has reached required position, independently of attention of the operator other than the closing of the required control switch.

A further object of the invention is to provide a valve actuating means having a power actuated member which moves through a closing cycle and an opening cycle, and means forming a linkage between the power actuated member and the closure of the valve so as to accomplish opening and closing of the valve, there being simple means for controlling the movement of the power actuator member through its opening and closing cycles.

A further object of the invention is to provide in this valve actuating means an electrically driven member which is moved through opening and closing cycles, and means forming a linkage whereby the electrically driven member will open and close the valve, there being automatically operating override switch means for controlling the operation of the electrically driven member.

A further object of the invention is to provide a remotely controllable valve actuating mechanism having a power driven rotary member continuously operated in one direction through valve opening and valve closing angular movements, with a linkage for moving the closure of the valve and means for controlling the rotation of the rotary member through its angular movements.

A further object is to provide a device of this character having a valve actuating mechanism driven through opening and closing cycles by an electrical motor and having an automatically operated switch means for controlling flow of electrical current to the motor through separate circuits so that the motor may be energized alternately through the separate circuits to effect sequential opening and closing of the valve.

A further object of the invention is to provide a simple combination of moving parts for transmitting power to effect opening and closing of the closure of a valve and for exercising an automatic overriding control over the operation of the mechanism.

A further object of the invention is to provide a valve actuating means for moving a valve between open and closed positions wherein the valve opening operation is accomplished slowly as compared to the relatively rapid closing operation (or vice versa, as desired).

Further objects and advantages of the invention will be brought out in the following part of the specification wherein I have made detailed disclosure of the preferred form of the invention for the purpose of disclosure without limiting the scope of the invention.

Referring to the drawings which are for illustrative purposes only:

Fig. 1 is a partly sectioned elevational view showing a preferred form of my invention.

Fig. 2 is a schematic view and electrical diagram showing the cooperating parts of the invention in the positions which they assume when the valve is opened.

Fig. 3 is a view similar to Fig. 2 but showing the positions of the parts when the valve is closed.

In Fig. 1, I show a valve 10, of the butterfly type having a body 11 with a passage 12, there being fittings 13 and 14 connected to the opposite ends of the body 11 for connection of the valve 10 into a duct or pipe line. The valve 10 has a closure member or butterfly 15 comprising a plate 16 mounted on a shaft 17. The closure member 15 is shown in opened positions in Figs. 1 and 2. By counterclockwise rotation of the shaft 17, looking downward on the shaft from the top, the member 15 is moved into closed position as shown in Fig. 3.

Brackets 18, secured to the upper part of the body 11 by bolts 19, support an actuator mechanism 20 comprising a base plate 21, post 22, an upper housing 23 and a motor 24. The shaft 17 projects up through the plate 21 and has on its upper end a lever 25 forming a part of a valve operating linkage 26. On the outer end of the lever 25, and forming an operative part thereof, there is a roller 27 supported on an upwardly projecting pin 28. A coil spring 29 has its inner end fixed on the shaft 17, between the plate 21 and the lever 25, and has its outer end engaging a pin 30 which projects upwardly from the plate 21. This spring 29 constantly exerts a force tending to rotate the closure member 15 from the opened to closed positions thereof respectively shown in Figs. 2 and 3.

The casing 23 supports a vertical shaft 31 in offset relation to the axis of the shaft 17. The lower end of this shaft 31 projects downwardly from the housing 23 into the space between the housing 23 and the plate 21 and has thereon an operator member 32 adapted for cooperative relation with the lever 25 to produce opening and closing movement of the closure member 15. The operator member 32 comprises a cam so formed that continuous angular or rotary movement thereof will accomplish reciprocating angular movement of the lever 25 between the positions of the lever 25 shown respectively in Figs. 2 and 3. As shown in Fig. 2, the cam 32 has a semi-cylindric low portion 33, a spiral face 34 leading to a cam high point 35 and a concavely curved face 36 connecting the cam high point 35 with the semi-cylindric portion 33. The face 36 forms an abrupt drop-off or recedence from the high point 35 of the cam 32 to the cam low point or portion 33. The curvature of the face 36 corresponds to the path of the surface of roller 27 confronting the face 36 when the roller 27 swings between the position in which it is shown in Figs. 2 and 3. The motor 24 is adapted for uni-directional rotation of the shaft 31 through gearing comprising a worm 37 which is fixed on the shaft 38 of the motor 24 and a toothed worm gear 39. A switch operating lever or cam 40 is fixed on the upper portion of the shaft 31 for operation of an override switch 41. The switch 41 is of snap type and includes a movable contact 42 which swings instantaneously between stationary contacts 43 and 44 in response to in and out movement of a switch operating member 45. The switch 41 cooperates in forming separate circuits for energization of the motor 24. A source of electrical energy, shown as a battery 47, is provided. One side of this battery 47 is grounded and the other side of the battery is connected through circuits 48 and 49 with the stationary contacts 43 and 44, these circuits 48 and 49 having respectively therein manually closable switches 50 and 51. The movable contact 42 is connected through a conductor 52 with one side of the motor 24, the other side of the motor 24 being grounded.

The closure member 15 is shown in opened position in Figs. 1 and 2. That is to say the cam 32 is positioned so that the point 35 thereof holds the lever 25 in the position shown in Fig. 2. The switch operating cam 40 is mounted on the shaft 31 in such position with relation to the position of the cam 32 that when the cam 32 holds the closure member 15 in open position the point of the cam 40 engages the switch operating member 45 and forces the same inwardly so that the contact 42 is moved into engagement with the contact 44, at this time the circuit 48 is opened and the circuit 49 is connected through the contacts 44 and 42 with the conductor 52 leading to the motor 24. At this time closing of the switch 50 will accomplish no result, but closing of the switch 51 will cause the electrification of the motor 24 so that it will drive the shaft 31 in counter-clockwise direction, moving the cams 32 and 40 angularly from the positions in which they are shown in Fig. 2 toward the positions in which they are shown in Fig. 3. The point 35 of the cam 32 will be moved in counterclockwise direction into a position such as shown in Fig. 3, out of the path of movement of the roller 27 of the arm 25, permitting the spring 29 to swing the arm 25 rapidly from the position in which it is shown in Fig. 2 to the position in which it is shown in Fig. 3, thereby closing the valve closure member 15 as shown in Fig. 3. Almost instantly thereafter, the cam 40 will reach the position in which it is shown in Fig. 3, permitting the switch operating member 45 to move downwardly into the position in which it is shown in Fig. 3, the movable contact 42 then swinging instantaneously from the contact 44 to the contact 43, thereby interrupting the circuit 49 through which the motor 24 has been energized, thereby stopping the motor 24 and stopping rotation of the cam 32, with the lever 25 in a position with the closure member 15 closed. Thereafter, the motor 24 may be energized only through closing of the switch 50, owing to the fact that the movable contact 42 has been carried from a position of engagement with the contact 44 into engagement with the contact 43. Therefore, if opening of the closure member 15 is required, the switch 50 will be closed to energize the motor 24 through the circuit 48 whereupon the motor will continue counter-clockwise rotation of the shaft 31, to carry the cams angularly in counterclockwise direction from the positions in which they are shown in Fig. 3 to the positions in which they are shown in Fig. 2. During counter-clockwise rotation of the cam 32 the spiral face 34 thereof will gradually and relatively slowly move the lever 25 from the position in which it is shown in Fig. 3 to the position in which it is shown in Fig. 2, gradually rewinding the spring 29, and by the time the point 35 of the cam 32 comes into engagement with the roller 27, the switch operating cam 40 will engage and depress the switch operating member 45, forcing the same inwardly from the position in which it is shown in Fig. 3 to the position in which it is shown in Fig. 2, shifting the movable contact 42 instantaneously into engagement with the stationary contact 44 and breaking the circuit 48 through which the motor 24 has been energized to accomplish opening of the valve 10. Now, only the switch 51 may be employed to energize the motor 24 and such energization of the motor 24 will result in a relatively small angular movement of the cams 32 and 40 into the positions in which they are shown in Fig. 3, accomplishing a fast closing of the valve 10, whereas the opening of the valve 10 is effected relatively slowly as previously described herein.

I claim:

1. An actuator for moving a part back and forth between first and second positions comprising: a rotary member; an electric motor connected to said rotary member so as to drive the same in one direction; a rotary cam on said rotary member, said cam having a high portion and a low portion, said portions being separated by arcs of movement of the cam; an operative connection between said cam and said part comprising a lever connected to said part so as to swing back and forth between two extreme positions as said part moves between said first and second positions, said lever having a follower engaging said cam whereby movement of said cam consecutively through said arcs of movement will effect movement of said part consecutively into said first and second positions thereof; means to form a pair of electrical circuits to individually connect said motor to a source of electrical energy, each of said circuits having a control switch therein; a master switch having movable contact means and operating means to instantaneously move said contact means so as to alternately complete said circuits so that each one of said circuits will be completed when the other of said circuits is incomplete; and a switch operating member moved by said rotary member in synchronization with said cam and actuating said operating means of said master switch in a manner to cause said movable contact means to open one of said circuits when said part moves to said first position and open the other of said circuits when said part moves to said second position.

2. An actuator for moving a part back and forth between first and second positions comprising: a rotary member; an electric motor connected to said rotary member so as to drive the same in one direction; a rotary cam on said rotary member, said cam having a high portion and an abrupt recedence to a low portion, said portions being separated by relatively long and short first and second arcs of movement of the cam; an operative connection between said cam and said part comprising a lever connected to said part so as to swing back and forth between two extreme positions as said part moves between said first and second positions, said lever having a follower engaging said cam whereby movement of said cam consecutively through said arcs of movement will effect relatively slow movement of said part into the first position thereof and relatively rapid movement into the second position thereof; means to form a pair of electrical circuits to individually connect said motor to a source of electrical energy, each of said circuits having a control switch therein; a master switch having movable contact means and operating means to instantaneously move said contact means so as to alternately complete said circuits so that each one of said circuits will be completed when the other of said circuits is incomplete; and a switch operating member moved by said rotary member in synchronization with said cam and actuating said operating means of said master switch in a manner to cause said movable contact means to open one of said circuits when said part moves to said first position and open the other of said circuits when said part moves to said second position.

3. An actuator for moving a part back and forth between first and second positions comprising: a rotary member; an electric motor connected to said rotary member so as to drive the same in one direction; a rotary cam on said rotary member, said cam having a high portion and a low portion, said portions being separated by arcs of movement of the cam; an operative connection between said cam and said part comprising a lever connected to said part so as to swing back and forth between two extreme positions as said part moves between said first and second positions, said lever having a follower engaging said cam whereby movement of said cam consecutively through said arcs of movement will effect movement of said part consecutively into said first and second positions thereof; means to form a pair of electrical circuits to individually connect said motor to a source of electrical energy, each of said circuits having a control switch therein; a master switch having movable contact means and operating means to instantaneously move said contact means so as to alternately complete said circuits so that each one of said circuits will be completed when the other of said circuits is incomplete, said operating means comprising an engageable member arranged for receiving movement which will effect operation of said operating means; and a switch operating member moved by said rotary member in synchronization with said cam and engaging and disengaging said engageable member to actuate said operating means of said master switch in a manner to cause said movable contact means to open one of said circuits when said part moves to said first position and open the other of said circuits when said part moves to said second position.

4. An actuator for moving a part back and forth between first and second positions comprising: a rotary member; an electric motor connected to said rotary member so as to drive the same in one direction; a rotary cam on said rotary member, said cam having a high portion and an abrupt recedence to a low portion, said portions being separated by relatively long and short first and second arcs of movement of the cam; an operative connection between said cam and said part comprising a lever connected to said part so as to swing back and forth between two extreme positions as said part moves between said first and second positions, said lever having a follower engaging said cam whereby movement of said cam consecutively through said arcs of movement will effect relatively slow movement into the first position thereof and relatively rapid movement into said second position; means to form a pair of electrical circuits to individually connect said motor to a source of electrical energy, each of said circuits having a control switch therein; a master switch having movable contact means and operating means to instantaneously move said contact means so as to alternately complete said circuits so that each one of said circuits will be completed when the other of said circuits is incomplete, said operating means comprising an engageable member arranged for receiving movement which will effect operation of said operating means; and a switch operating member moved by said rotary member in synchronization with said cam and engaging and disengaging said engageable member to actuate said operating means of said master switch in a manner to cause said movable contact means to open one of said circuits when said part moves to said first position and open the other of said circuits when said part moves to said second position.

5. An actuator for moving a part back and forth between first and second positions comprising: a shaft element having thereon a first rotary cam with a high point and a low portion closely following the same; a lever supported adjacent said cam having a follower to engage said cam and effect reciprocating movement of said lever as said cam is rotated; means connecting said lever to said part so that movement of said lever effected by said cam back and forth between extreme positions will cause movement of said part into said positions thereof; a motor connected so as to rotate said shaft element; means forming first and second circuits for connecting said motor to a source of electrical current, said means comprising a snap action double throw switch for alternately completing said circuits, said switch having an operating member positioned so as to receive operating movement;

a second rotary cam rotated by said shaft element, said second cam having a point positioned so as to engage and move said operating member of said switch as said high point of said first cam approaches said cam follower, and so as to disengage said operating member as said low portion of said first cam is brought into cooperation with said cam follower by rotation of said shaft element; and separate switch means for opening and closing said circuits.

JAMES E. CHAPMAN.

References Cited in the file of this patent

UNITED STATES PATENTS

| Number | Name | Date |
|---|---|---|
| 1,411,712 | Diehl | Apr. 4, 1922 |
| 1,518,619 | Welch | Dec. 9, 1924 |
| 1,698,174 | Sauter | June 8, 1929 |
| 1,754,936 | Dean | June 17, 1930 |
| 1,846,583 | Chase | Feb. 23, 1932 |
| 2,264,013 | Webb | Nov. 25, 1941 |
| 2,280,062 | Craig | Apr. 21, 1942 |
| 2,415,466 | Curtis | Feb. 11, 1947 |

FOREIGN PATENTS

| Number | Country | Date |
|---|---|---|
| 330,873 | Great Britain | June 19, 1930 |
| 164,924 | Switzerland | Jan. 2, 1934 |